United States Patent [19]

Bragg et al.

[11] 3,719,513

[45] March 6, 1973

[54] SPRAYABLE GYPSUM PLASTER COMPOSITION

[75] Inventors: Ralph J. Bragg, Arlington, Mass.; Raymond E. Rothfelder, La Canada, Calif.

[73] Assignee: W. R. Grace & Co., Cambridge, Mass.

[22] Filed: March 10, 1971

[21] Appl. No.: 122,703

[52] U.S. Cl. ..................................106/114, 106/115
[51] Int. Cl. ...........................................C04b 11/00
[58] Field of Search.......................106/109, 111–115

[56]     References Cited

UNITED STATES PATENTS 3,369,929   2/1968   Petersen..............................106/109
2,485,259   10/1949  Chrisler................................106/114

Primary Examiner—James E. Poer
Attorney—C. E. Parker and Armand McMillan

[57]     ABSTRACT

Fire-retardant coatings for structural metal members are obtained by spraying onto the metal settable plaster compositions which are air-containing pumpable aqueous slurries of compositions consisting essentially of, on a dry weight basis, from 52 to 62 percent calcined gypsum, from 2.5 to 18 percent high wet bulking cellulosic fiber, sufficient foaming agent to achieve good workability and satisfactory pumping characteristics, and enough lightweight aggregate to complete the formula.

7 Claims, 4 Drawing Figures

MODULUS OF ELASTICTY (E)

SURFACE HARDNESS

THERMAL CONDUCTIVITY vs. DENSITY

SHRINKAGE TEST

SPRAYABLE GYPSUM PLASTER COMPOSITION

THE PRIOR ART

In the course of erecting steel structures, a thick coating of inorganic material is commonly applied to the metallic structural elements to achieve a number of objectives including fire retardance, improved appearance and sound deadening. while several types of formulations have been applied for these purposes over the years by means of a variety of techniques, the most successful system so far consists in spraying onto the steel surfaces settable aqueous mixes composed essentially of calcined gypsum, a lightweight inorganic material such as exfoliated vermiculite, an inorganic fibrous substance, preferably asbestos, and a foaming agent. A composition of this type is described by Petersen in U.S. Pat. No. 3,369,929, along with the most desirable application technique, i.e., pumping the aqueous mix and spraying it directly onto the steel in one layer.

In order to be suitable for such use, coating mixes, both in the wet and dry state, must possess a number of crucial properties. They must be able to hold the large quantity of water that renders them capable of being pumped easily and to great heights. Yet they must retain a consistency sufficient to prevent segregation or settling of ingredients and permit adequate "yield" or coverage of steel surface at a given thickness. The coating mixes, furthermore, must obviously adhere to steel surfaces, both in the slurried state and in the dry state. Also, the mix must set without the undue expansion or shrinkage which could only result in the formation of cracks that would seriously deter from the insulative value of the dry coating.

As intimated earlier, this complex balance of properties has substantially been achieved heretofore by gypsum-vermiculite mixes containing asbestos fiber. However, health considerations have recently caused the banning of asbestos-containing compositions, thus leaving the industry without an acceptable substitute. Elimination of the asbestos from the type of composition just discussed results in changes in properties that are sufficiently extensive to render them unsuitable for the application contemplated.

SUMMARY OF THE INVENTION

It has now been discovered that settable, sprayable plaster composition yielding satisfactory fire resistance can be made by adding water to a mixture consisting essentially of calcined gypsum, a lightweight aggregate material such as exfoliated vermiculite, cellulosic fiber of high wet bulking capacity, and sufficient foaming agent to provide good workability and pumping characteristics. The composition of the invention contains, on a dry basis, about 52 percent to about 62 percent calcined gypsum, about 2.5 percent to about 18 percent cellulose fiber, about 0.2 percent foaming or air-entraining agent, and enough lightweight aggregate to complete the formula.

A cellulosic fiber of high wet bulking capacity is defined, for the purpose of this invention, as a fibrous cellulosic material which, upon thorough suspension in water at the rate of 1.6 grams per 50 ml water, does not settle more than 15 percent within 30 minutes.

DETAILED DESCRIPTION

The following examples are provided to illustrate the compositions of the invention as well as their excellent properties.

Example 1

A settable gypsum plaster composition is prepared by dry mixing the following ingredients:

|  |  | % By Weight |
|---|---|---|
| Calcined gypsum | 288.3 lbs | 58% |
| No. 3 vermiculite | 188.3 lbs | 38% |
| Cellulose fiber | 19.9 lbs. | 4% |
| Totals: | 496.5 lbs. | 100% |

To this mixture is added a small quantity of air-entraining agent. In this instance, this amounts to one pound of technical sodium lauryl sulfate.

The vermiculite used in this preparation is a standard grade of expanded material having density of 5.25 pcf. The cellulose fiber is a purified unbleached softwood cellulose consisting of over 99.5 percent cellulose and having a particle size distribution such that approximately 33 percent of the material is retained on a No. 60 Tyler screen with about 33 percent more retained on a No. 150 screen.

The dry mixture just described can be stored until desired. At the point of use, it is thoroughly admixed with water and is sufficiently agitated, or otherwise aerated, to provide a slurry of the proper consistency which can then be pumped through spray-application apparatus for direct spraying onto metal surfaces.

Fire-resistance of Plaster Compositions

Fire-resistance classifications, or so-called fire ratings, based on "Conditions of Acceptance" for floor and roof in the standard for Fire Tests of Building Constructions and Materials, Underwriters' Laboratories 263 (ASTM E119, NFPA 251) have been obtained for steel structures coated with the plaster of this invention, for example for coatings on structural steel columns of size W10×49 and larger:

| Thickness of Coating | Duration of Protection |
|---|---|
| 2 ½" | 4 hrs |
| 1 ⅞" | 3 hrs |
| 1 ½" | 2 hrs |

This degree of fire resistance which is comparable to that of asbestos-containing plaster, is rather remarkable on considering that the plasters of this invention are formulated with combustible cellulose fibers, a development which contrasts with the trend of the art calling for employment of inorganic fibrous substances.

Example 2

A conventional asbestos-containing sprayable plaster composition was prepared essentially as in Example 1, mixed with water, properly aerated, sprayed on steel and allowed to dry and set. The dry mix ingredients of this composition were as follows:

|  |  | % By Weight |
|---|---|---|
| Gypsum | 433 lbs. | 58.55% |

| | | |
|---|---:|---:|
| Vermiculite No. 3 | 212.5 lbs. | 28.73% |
| Asbestos | 93.0 lbs. | 12.58% |
| Sodium | 1.0 lbs. | 0.14% |
| laurylsulfate | 739.5 lbs. | 100.00% |

A number of properties of coatings obtained from the asbestos-containing composition of this example were compared to those of cellulose fiber formulations. It was noted that the latter product generally performs better than asbestos formulation.

Figure 1:
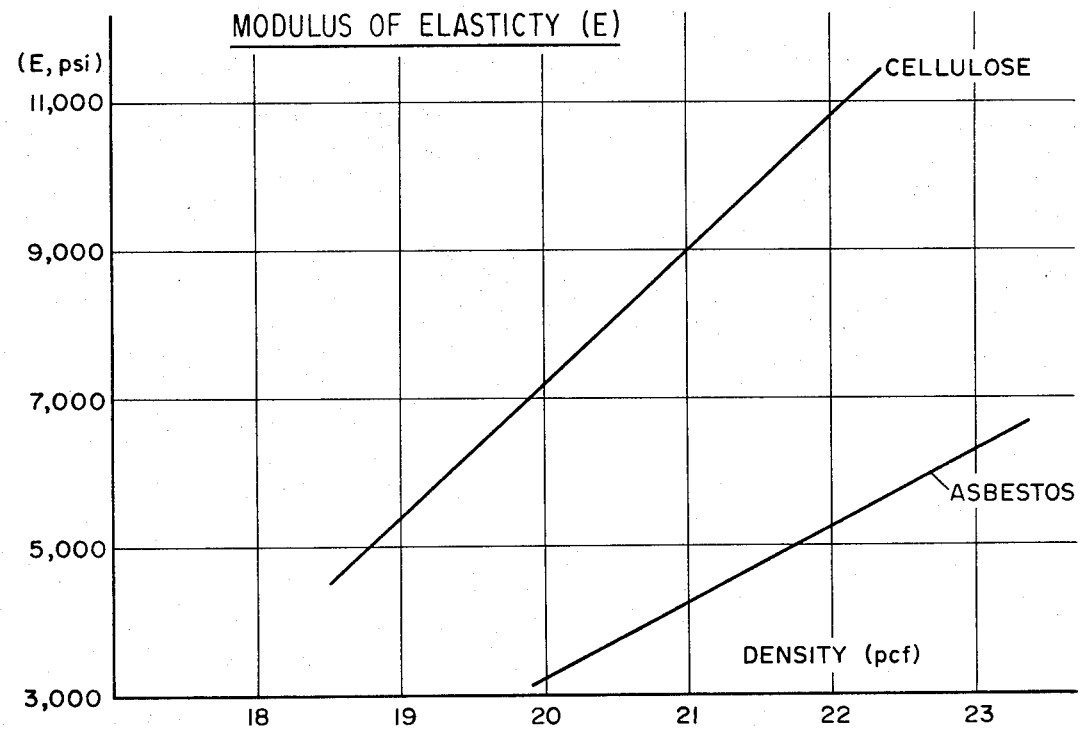
Figure 2:
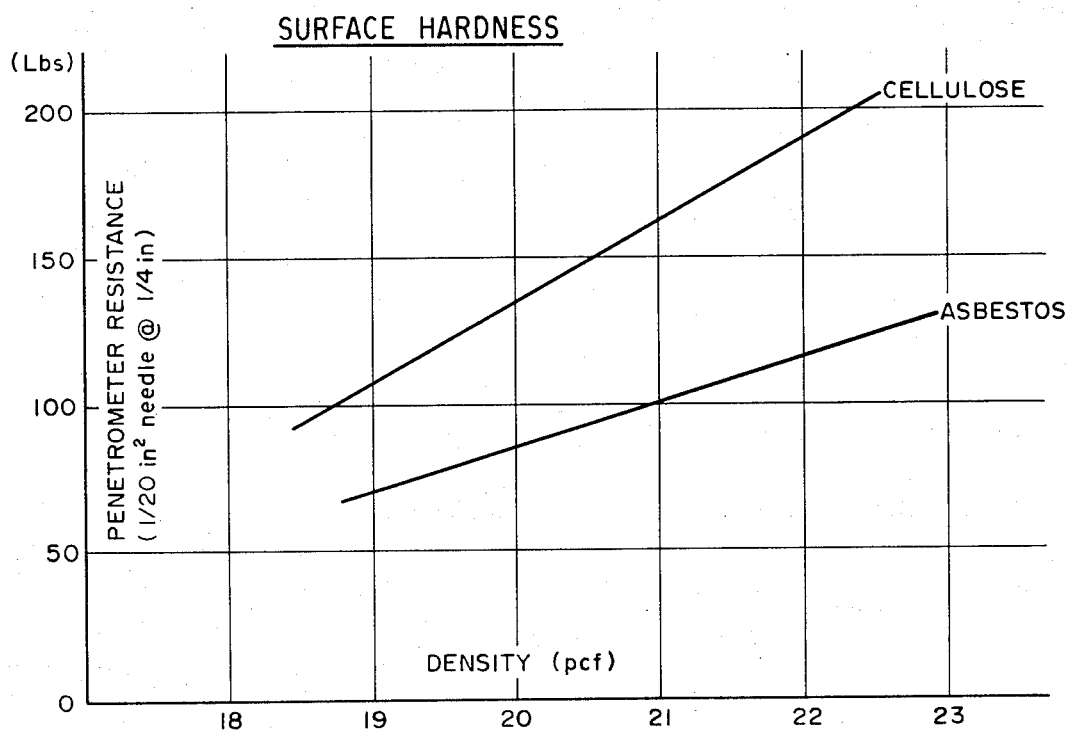

Specifically, it was determined that on an equal density basis, set cellulose fiber plaster has a greater surface hardness, a higher modulus of elasticity, a lesser thermal conductivity and a smaller volume change during setting than comparable conventional asbestos fiber plaster. These differences in properties and behavior at normal plaster densities are illustrated by the accompanying drawings in which FIG. 1 shows the modulus of elasticity, FIG. 2 shows differences in surface hardness at normal densities, FIG. 3, the thermal conductivity of "K factor," and FIG. 4, the movement of the plaster mass as it sets.

The modulus of elasticity was determined according to ASTM method C–293. As shown in FIG. 1, the modulus (E) rises from about 5000 to 11,000 psi for cellulose fiber-containing plaster over a density range of 19 to 23 pcf, a level roughly twice that of asbestos fiber plaster over the same density range. Inasmuch as a higher modulus ultimately contributes to some extent to hardness of the material, the unexpected increase in modulus is beneficial for an application such as that to which the compositions of the invention are destined. Hardness determinations carried out on the same materials support this improved picture at the densities tested by revealing essentially a two-fold increase in penetration resistance (FIG. 2). These penetration resistance values were obtained by means of a Soiltest Penetrometer Model C421, using a 0.05 square inch needle and a penetration depth of 0.25 inch. Given the mechanical abuse that a lightweight plaster must undergo in the course of erecting and finishing a building, the added surface hardness of the plaster of the invention is indeed welcome. Another greatly appreciated result of increased surface hardness, both at the construction stage and during the entire life of the structure, is the non-dusting characteristic of the new materials now disclosed.

Figure 3:
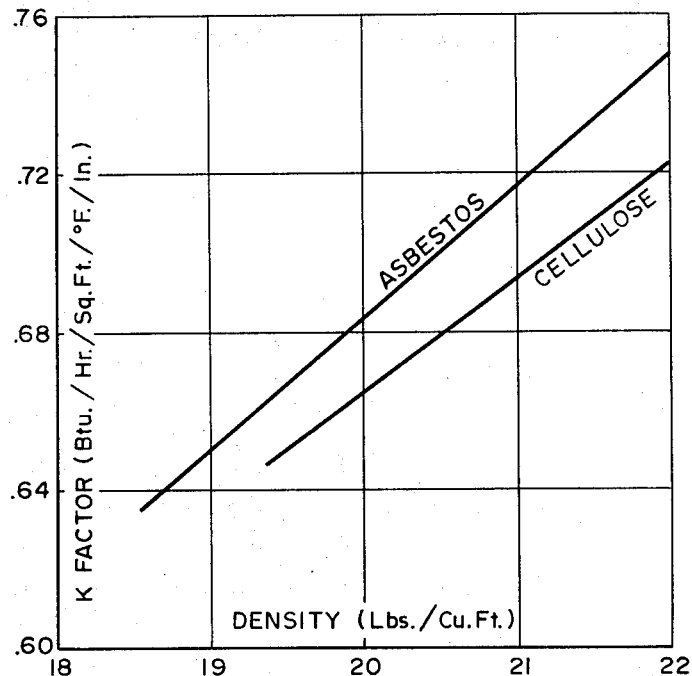

The trade acceptability of the lightweight organic-fiber-containing plasters of this invention for fire resistance applications has already been disclosed. Among the properties which contribute to this fine resistance, a crucial one is certainly thermal conductivity or, as measured in the trade, the "K factor". This value is the conventional coefficient of thermal conductivity expressed in btu-inch/hour square foot° F. A determination of this K factor by the ASTM method C177–63 demonstrated that, at equal density, cellulose-containing plaster posesses a lower conductivity than asbestos plasters (FIG. 3). One can only speculate on the reasons for this improved value.

Figure 4:
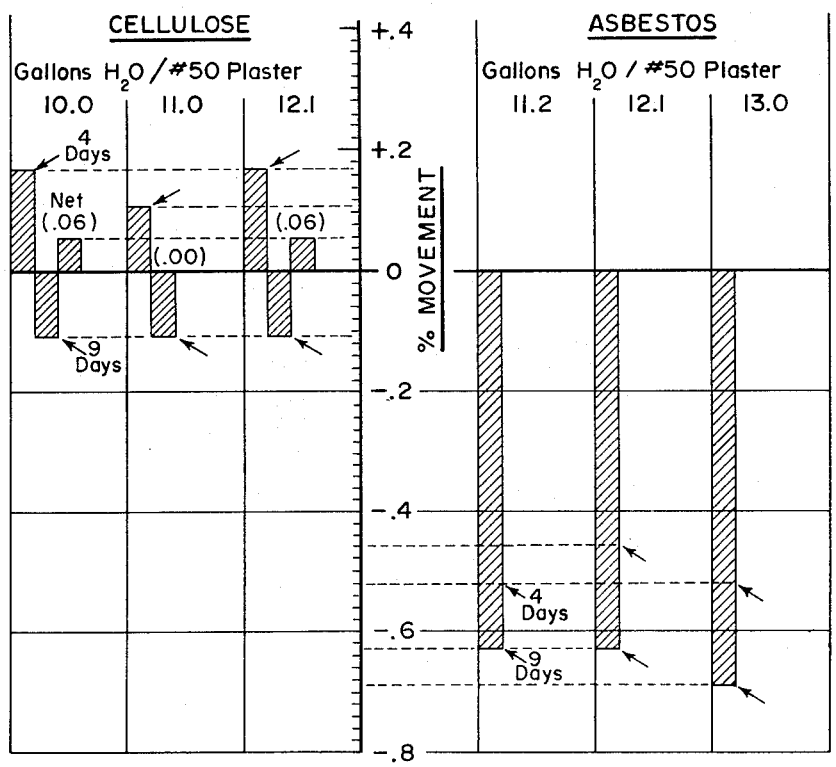

FIG. 4 illustrates another important characteristic of lightweight plasters, the volume stability on drying and setting. It is obvious that when volume changes past a certain magnitude, varying degrees of undesirable results such as cracking, peeling, bulging, etc. will occur, with attendant decrease in the utility of the material. On determination by optical measurement of the volume changes in drying and setting standard masses (900mm × 75 mm × 20 mm bars) of various compositions over a period of 9 days, i.e. a period long enough for all movement to cease, it was found that cellulose-containing plasters are more volume stable than their asbestos counterpart, both in overall magnitude of volume change in any direction and in net volume change.

Example 3

Kraft process fiber, 20 parts, is suspended in water, 1050 parts, to form a slurry. To this is then added with mixing No. 4 expanded vermiculite, 189 parts, $CaSo_4 \cdot 1/2 H_2O$, 288 parts, and 45 percent sodium lauryl sulfate, 1.5 parts.

The Kraft process fiber used here is a cook sulfate originating from a blend of western red cedar, hemlock and spruce. The fibers average 2.70 mm in length and a screen analysis reads as follows:

| | |
|---|---|
| + 14 mesh | 59% weight |
| + 28 | 24 |
| + 48 | 7 |
| +100 | 5 |
| −100 | 5 |

The resulting plaster has a setting time of about 3 horus and 20 minutes. It showed an average wet density of 73.12 pcf and an average dry density of about 14.6 pcf. The material is comparable to the plaster of Example 1 in all respects.

The compositions of the invention, as mentioned earlier, contain gypsum as well as a lightweight aggregate, an organic fibrous material and a foaming agent.

As a lightweight aggregate, there may be used instead of the expanded vermiculite of Example 1, any lightweight weight inorganic material having a density within the range of about 4.5 to about 8 pcf. Perlite, clay and slag, in the expanded state, as well as diatomaceous earth are examples of useful materials. Vermiculite, however, is preferred not only because the intermediate slurries containing it pump best, but also because of the greater plaster thickness that can be applied in one pass when it is the aggregate selected.

The foaming agents or air-entraining agents, that can be used in the formulations of the invention are well known to the art and thus can be disposed of without too much comment. Suffice it to say that such materials as sulfated monoglycerides, sodium alkyl arylsulfonates of various manufacture, sodium lauryl sulfate and the like are used in quantities sufficient to cause the aqueous slurries to achieve the consistency needed for pumping and spraying. Obviously, dry foaming agents can be incorporated into the dry gypsum-aggregate-fiber mixes before dilution with water, while both dry and liquid agents can be used once the slurry is made. In any event, as little as about 0.05 percent of foaming agent, dry basis, may suffice for a given formulation.

The fibrous component of the plaster of the invention constituting, as seen earlier, from about 2.5 to 18 percent of the mix on a dry basis and preferably about 3 to 8 percent, consists of short or chopped organic fibers of natural or synthetic origin which possess a minimum wet bulking capacity of about 85 percent. Wet bulking capacity is determined by a test similar to Wet Volume Test D-1 of the Quebec Asbestos Mining Association which can be found at page 98 of "Testing Procedures for Chrysolite Asbestos Fiber," Second Edition (1966). The test, as carried out here, consists in suspending 1.6 g of fiber in 50 ml water in a graduated cylinder and noting the amount of settling that takes place within a 30 minute period. A material showing more than 15 percent settling is not acceptable. Usable materials in this class include cellulose fibers generally such as wood fiber, sisal, hemp, cotton, jute, ramie, rayon and the like which either possess the required bulking ability naturally or have acquired it by appropriate physical and chemical modification, for instance by delignification. A preferred material of this type is the purified softwood fiber used in Example 1.

Having thus described the invention, especially in terms of application to steel surfaces, it should be noted that the fire resistant compositions disclosed will also adhere quite well to other common materials, such as wood, cement, brick and the like. It will further be apparent to the man skilled in the art that the formulations described may be altered to some degree without departing from the scope of the invention as defined by the following claims.

We claim:

1. A gypsum plaster composition, capable of yielding a settable, sprayable slurry on addition of water, which consists essentially of on a dry weight basis, calcined gypsum, about 52 to 62 percent, high wet bulking cellulosic fiber, about 2.5 to about 18 percent, an air-entraining agent, about 0.2 percent, and sufficient lightweight aggregate to complete the formula.

2. The composition of claim 1 wherein the cellulosic fiber constitutes from about 3 to about 8 percent of the dry composition.

3. The composition of claim 2 wherein the cellulosic fiber is provided by a sulfite pulp.

4. The composition of claim 2 wherein the cellulosic fiber is provided by a kraft pulp.

5. The composition of claim 1 wherein the lightweight aggregate is an expanded vermiculite having a bulk density within the range of about 4.5 to about 8 pcf.

6. A sprayable, settable plaster slurry consisting of the plaster composition of claim 1 suspended in water at a level of about 9 to about 14 gallons per 50 lbs. of dry composition.

7. A fire-retardant set gypsum plaster composition-metal structural assembly consisting of structural metal members coated with the composition of claim 6.

* * * * *